(12) United States Patent
Glass

(10) Patent No.: US 6,247,770 B1
(45) Date of Patent: Jun. 19, 2001

(54) FURNITURE CONSTRUCTION

(75) Inventor: Peter Glass, Napa, CA (US)

(73) Assignee: Virco Mfg. Corporation, Torrance, CA (US)

( * ) Notice: Subject to any disclaimer, the term of this patent is extended or adjusted under 35 U.S.C. 154(b) by 0 days.

(21) Appl. No.: 09/249,581

(22) Filed: Feb. 11, 1999

(51) Int. Cl.⁷ .................................................. A47B 47/00
(52) U.S. Cl. ...................... 312/263; 312/265.1; 108/107; 108/147.12
(58) Field of Search ................................ 211/187, 90.02; 248/243; 312/265.1, 265.2, 265.3, 263, 257.1, 351.1, 351.3, 351.11, 351.12; 108/106, 107, 110, 147.11, 147.12, 190, 147.13, 147.15, 147.17, 180, 186, 189, 156, 157.13, 158, 158.11; 403/401, 402, 231

(56) References Cited

U.S. PATENT DOCUMENTS

| | | | |
|---|---|---|---|
| 875,755 | * 1/1908 | Wanner | 403/231 |
| 1,281,104 | * 10/1918 | Unger | 108/189 X |
| 2,802,575 | * 8/1957 | Harrison | 108/106 |
| 4,055,318 | * 10/1977 | Duckett | 248/243 |
| 4,128,222 | * 12/1978 | Wiczer | 108/156 X |
| 4,368,936 | * 1/1983 | Worrallo | 403/231 X |
| 4,698,946 | * 10/1987 | Wendt | 248/243 X |
| 4,840,440 | * 6/1989 | Dieter | 403/402 X |
| 5,039,177 | * 8/1991 | Newell et al. | 312/263 X |
| 5,934,203 | * 8/1999 | Glass | 108/50.02 X |

* cited by examiner

Primary Examiner—Janet M. Wilkens
(74) Attorney, Agent, or Firm—James E. Brunton, Esq.

(57) ABSTRACT

Specially designed articles of furniture for use in conference and office settings which include a plurality of uniquely configured supporting legs, one or more article support structures disposed centrally of the supporting legs and a novel connector member for interconnecting the support structures of the legs. The connector member also enables the quick and easy interconnection of the polygonal panels that make up certain of the article support structures of the apparatus. The articles of furniture can be used to support and transport a wide variety of devices such as audio and video equipment, slide projectors, overhead projectors and the like.

11 Claims, 9 Drawing Sheets

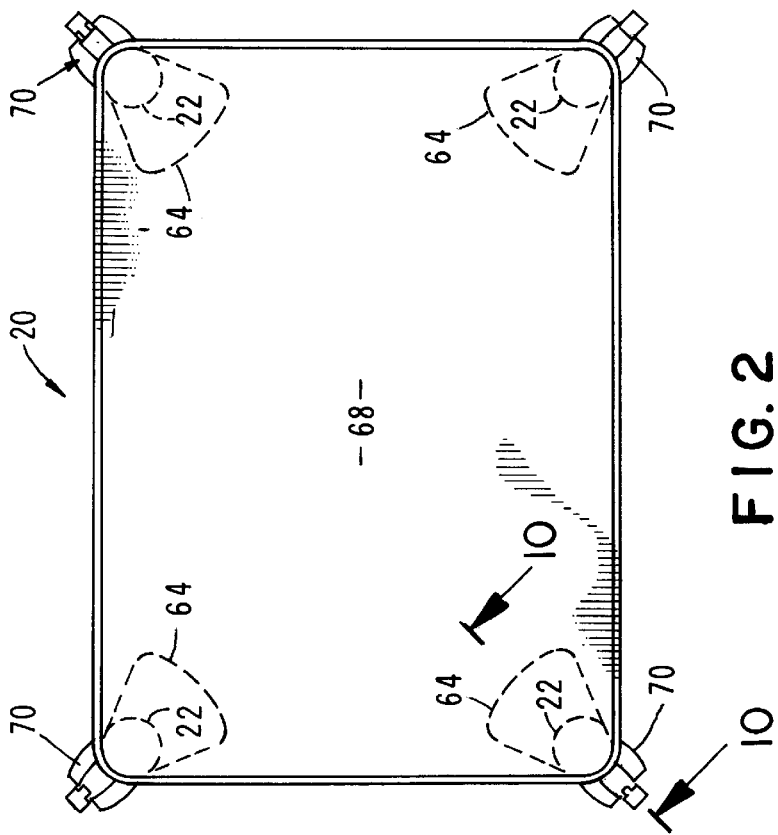
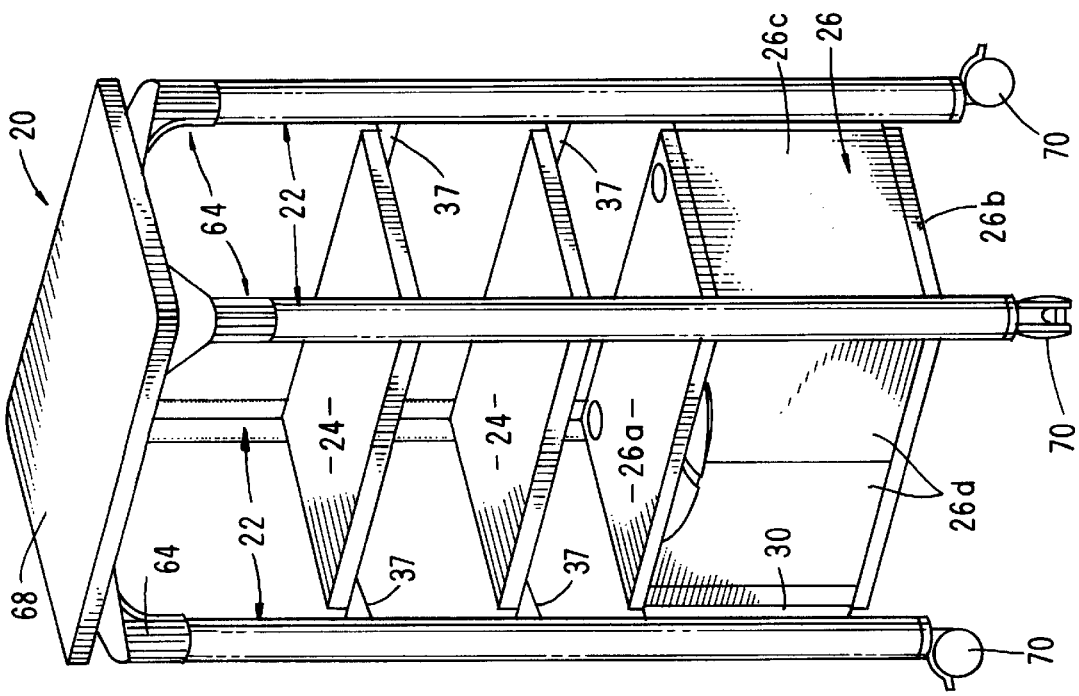
FIG. 2
FIG. 1

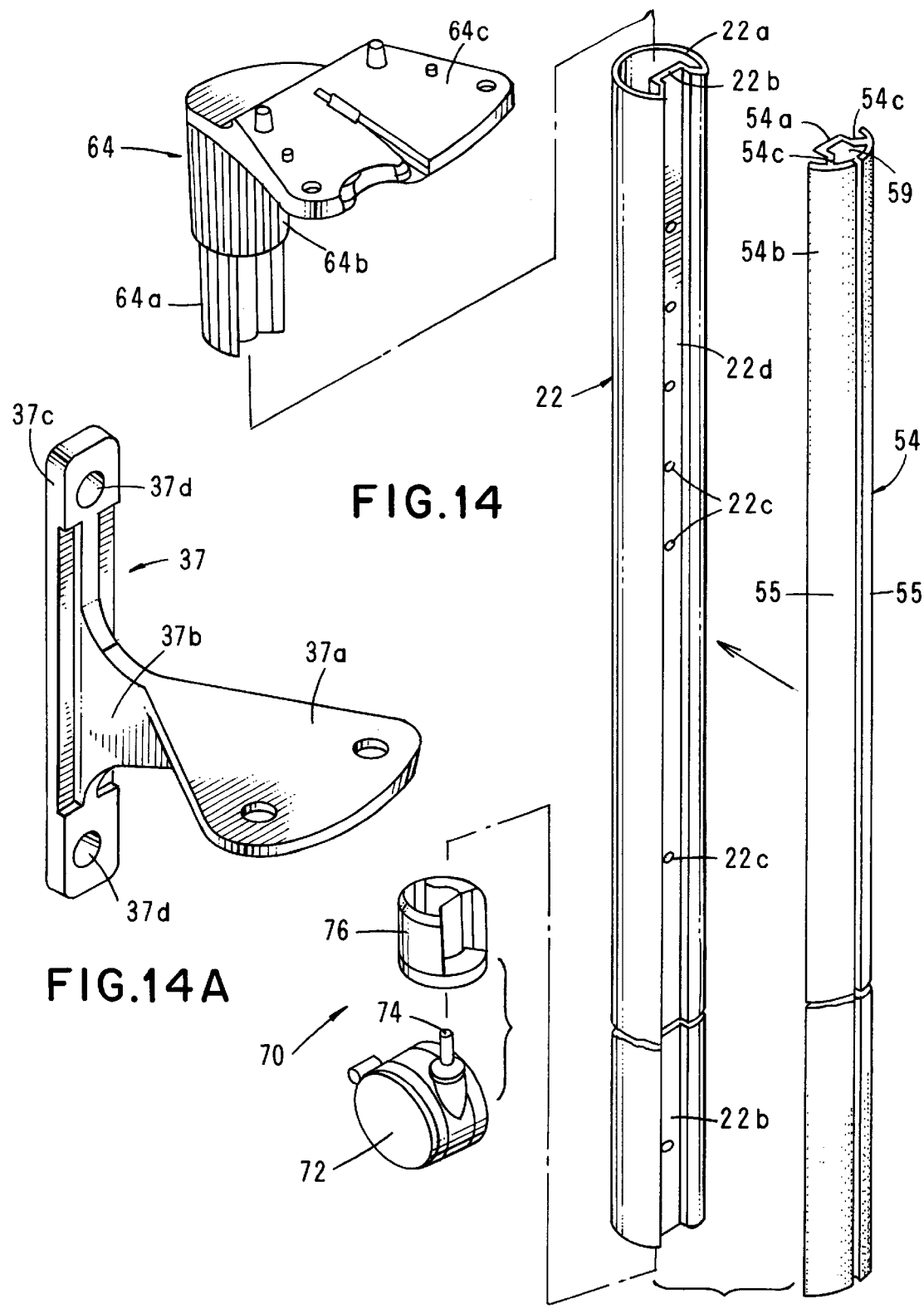

FURNITURE CONSTRUCTION

BACKGROUND OF THE INVENTION

1. Field of the Invention

The present invention relates generally to furniture construction. More particularly, the invention concerns a novel furniture construction that embodies a unique corner construction that functions to interconnect the components of a centrally disposed article support structure with a plurality of support members that circumscribe the article support structure.

2. Discussion of the Prior Art

In recent years furniture design has evolved quite rapidly. Particularly in institutional type furniture have designs changed markedly from somewhat crude, heavy metal, welded and bolted construction, to much more attractive, lighter weight furniture, the component parts of which can be readily assembled and disassembled in the field.

Major problems encountered in the design of modern institutional type furniture include the design of corner constructions for interconnecting the side and back panels of article support and storage structures and the design of connectors for interconnecting the article support and storage structures with supporting members such as spaced apart support legs. It is the solution of these prior art problems that is at the heart of the present invention.

One proposed solution to corner construction design is disclosed in U.S. Pat. No. 4,840,440 issued to Dieter. The corner construction proposed by Dieter includes an extrusion construction for mating with and joining a pair of side panels of an article support structure. The corner construction is defined in cross-section by at least one elongated rib section, squared corners positioned at one end of the rib section, a pair of external leg sections at the other end of the rib section and a pair of internal leg sections disposed parallel to the external leg sections and located along the rib section substantially midway between the squared corners and the external leg sections. A normal projection of each internal leg section onto the adjacent external leg sections ends substantially halfway along the length of the external leg section and apertures are provided for passing screws through the portion of the external leg sections beyond that normal projection. The facing ends of the side panels are provided with diagonal faces meeting with the opposite faces of the extrusion rib section and with squared off faces meeting with the square section. Elongate slots are provided substantially midway between the inside and the outside broad surfaces of the panels for receiving the internal leg sections.

Another prior art corner construction is disclosed in U.S. Pat. No. 4,014,618 issued to Kristiansen. This patent concerns a corner structure for use in shelves, cabinets, boxes and similar box shaped article support structures. In accordance with the method of the Kristiansen patent, rectangular and polygonal panels are assembled by means of a rod-shaped junction of substantially hour-glass cross-section. The junction is provided with or may be used in combination with, separate uniting members having projections designed to be attached to the panels by means of screws or the like.

Still another prior art corner construction and table leg connector is described in U.S. Pat. No. 2,148,353 issued to Hoffman. This corner construction comprises a generally wedge shaped corner block that is connected with the side panels of a table top assembly by wood screws and is also connected to a table leg by an elongated bolt which extends through the wedge shaped block and into the interior of the hollow table leg.

The foregoing prior art patents exemplify the progress made in furniture design from the traditional bolt and wood screw connector approach to the more sophisticated approaches embodying metal extrusions of the character described in the Dieter patent. As will become apparent from the discussion that follows, the present invention exemplifies still further major advances in furniture design and provides an elegant, highly novel design for a totally new line of institutional furniture that can be readily assembled, adjusted and disassembled in the field by relatively unskilled workers using simple hand tools.

SUMMARY OF THE INVENTION

It is an object of the present invention to provide a number types of highly attractive, sturdy furniture constructions such as cabinets, book cases, video carts, slide projector carts, lectern carts, book carts, easels, and similar articles that can be quickly and easily assembled and disassembled in the field by relatively unskilled workers using simple tools.

More particularly, it is an object of the present invention to provide furniture construction of the aforementioned character which are specially designed for use in conference and office settings and which include a plurality of uniquely configured supporting legs, one or more article support structures disposed centrally of the supporting legs and a highly novel arrangement for interconnecting the support structures with the legs.

Another object of the invention is to provide furniture constructions of the type mentioned in the preceding paragraphs which include a novel corner construction that enables the quick, easy and secure interconnection of the polygonal panels that make up the article support structures of the apparatus.

Another object of the invention is to provide various articles of furniture of the class described which are lightweight, extremely durable in use and yet are highly attractive in appearance.

Another object of the invention is to provide a line of furniture of the character described which is extremely versatile, is readily mobile and can be used to support and transport a wide variety of devices such as audio and video equipment, slide projectors, overhead projectors and the like.

Another object of the invention is to provide a line of furniture of the character described in the preceding paragraph that includes a fully functional wire chase that accommodates wires and cables for safely connecting electronic equipment with remote power sources.

A particular object of the invention is to provide a furniture construction in which the member used to interconnect the enclosure panels of the article support structure is also used to uniquely interconnect the article support structure itself with the supporting legs of the apparatus.

Still another object of the invention is to provide furniture of the character described in the preceding paragraph in which the article supporting structures can be quickly and easily adjustably positioned relative to the supporting legs of the apparatus.

BRIEF DESCRIPTION OF THE DRAWINGS

FIG. 1 is generally perspective view of one form of furniture construction of the present invention, namely a rolling projector cart.

FIG. 2 is a top plan view of the construction shown in FIG. 1.

FIG. 14 is a generally perspective, exploded view of the leg assembly shown in FIG. 13.

FIG. 14A is a generally perspective view of a second form of connector element of the invention for interconnecting a second type of article support with one of the support legs.

DESCRIPTION OF THE INVENTION

Figure 3:
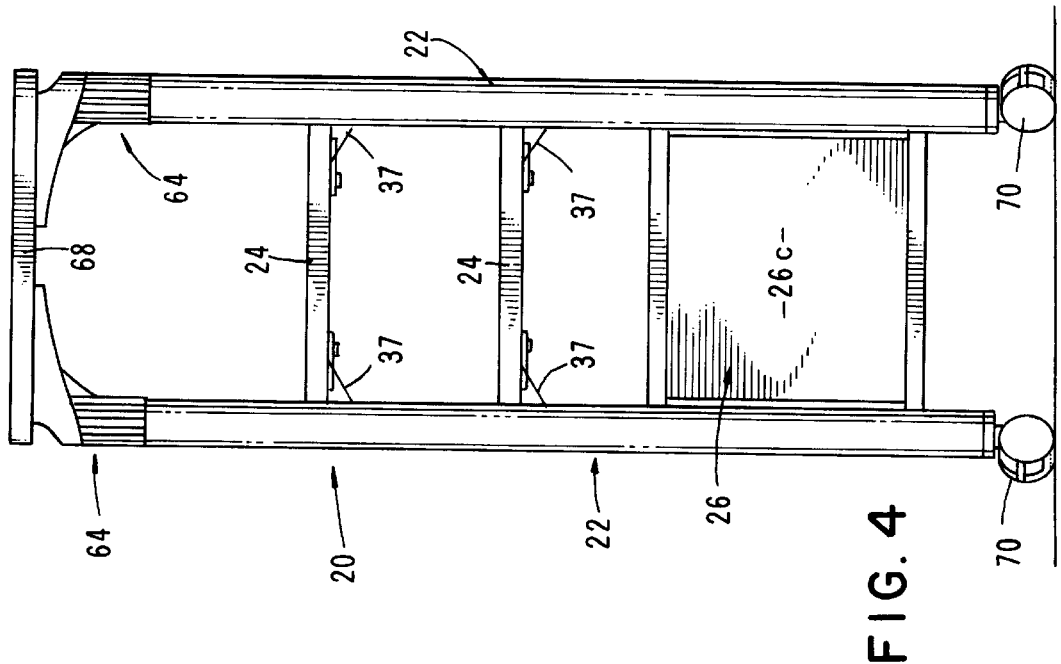
FIG. 3 is a front elevational view of the construction.
Figure 4:
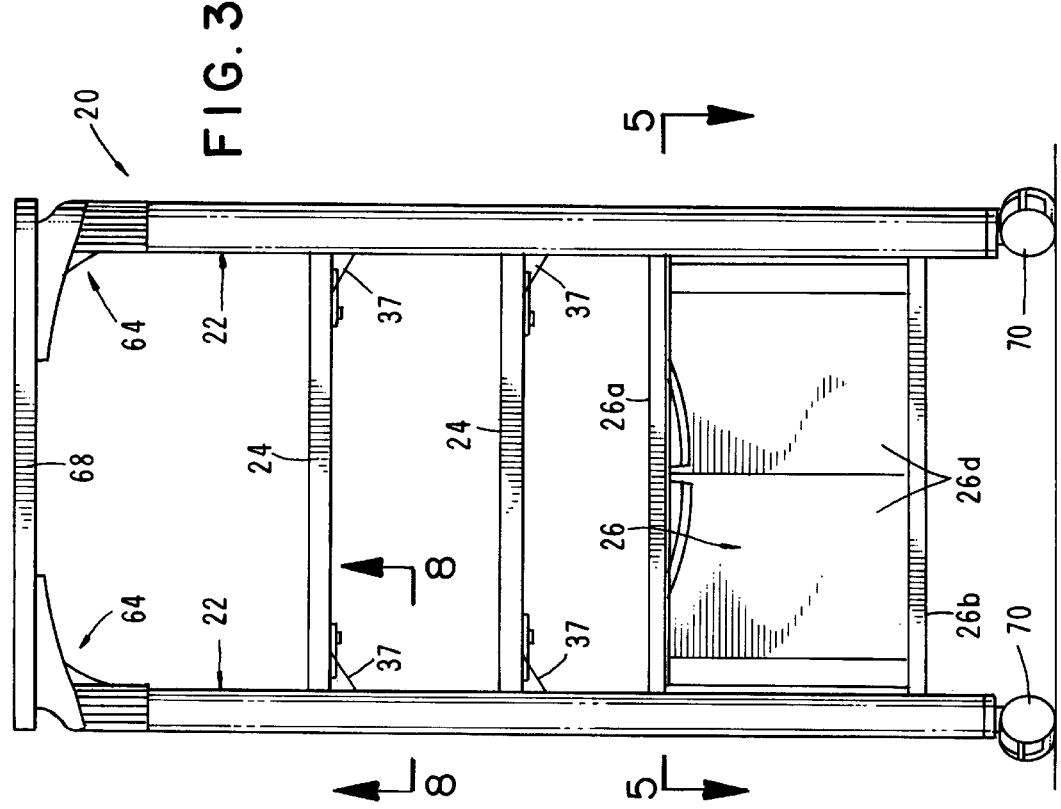
FIG. 4 is a side elevational view of the construction.

Referring to the drawings and in particularly to FIGS. 1 through 4, one form of the furniture construction of the present invention is there illustrated and generally designated by the numeral 20. This construction here comprises a rolling projector cart having a plurality of specially configured, spaced apart ground engaging support members, or legs 22. As best seen by referring to FIGS. 6 and 15, each of the support members 22 includes a curved wall 22a and an elongated, substantially flat connector strip portion 22b. Disposed internally of the spaced apart legs 22 are several different types of article support structures for supporting and enclosing various types of articles. More particularly, the article support structures identified in the drawings by the numeral 24 comprise supporting shelves which are maintained in position by novel connector means, the character of which will presently be described. Another article support structure, generally designated in the drawings by the numeral 26, comprises a box like enclosure for storing various types of articles. This enclosure is made up of interconnected top, bottom and side polygonal panels 26a, 26b and 26c respectively. These panels are uniquely interconnected together by the corner connection means of the invention, the character of which will be described in detail in the paragraphs which follow. Also forming a part of enclosure 26 are pivotally mounted front doors 26d.

Figure 6:
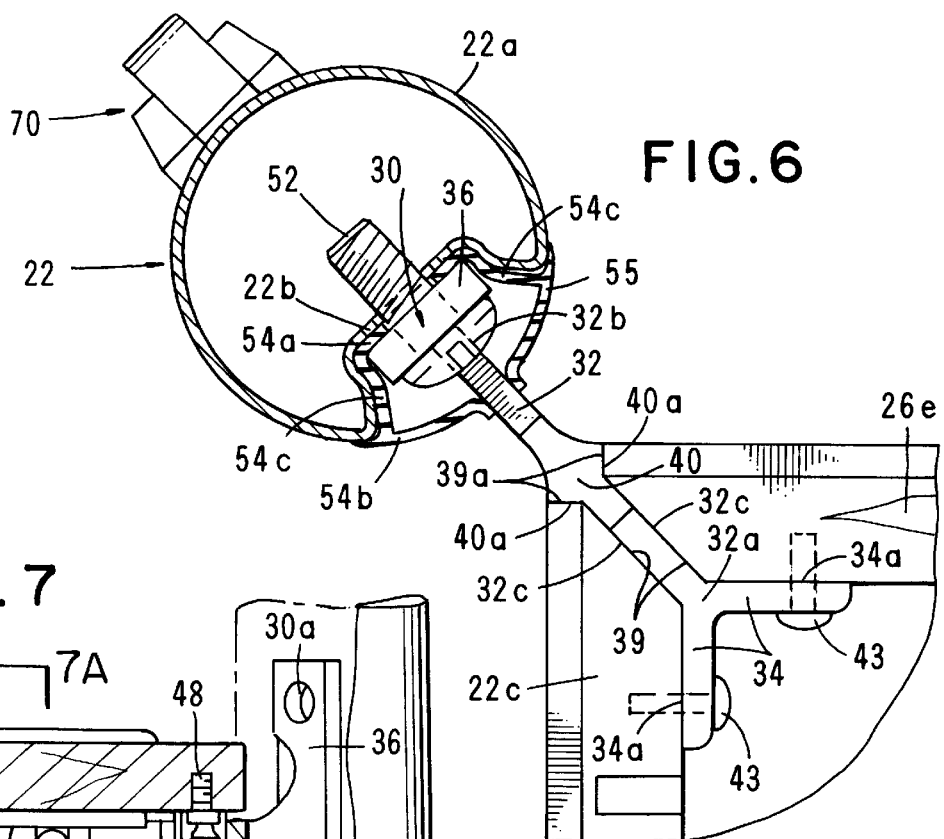
FIG. 6 is an enlarged cross-sectional of the area identified in FIG. 5 by the numeral 6.
Figure 12:
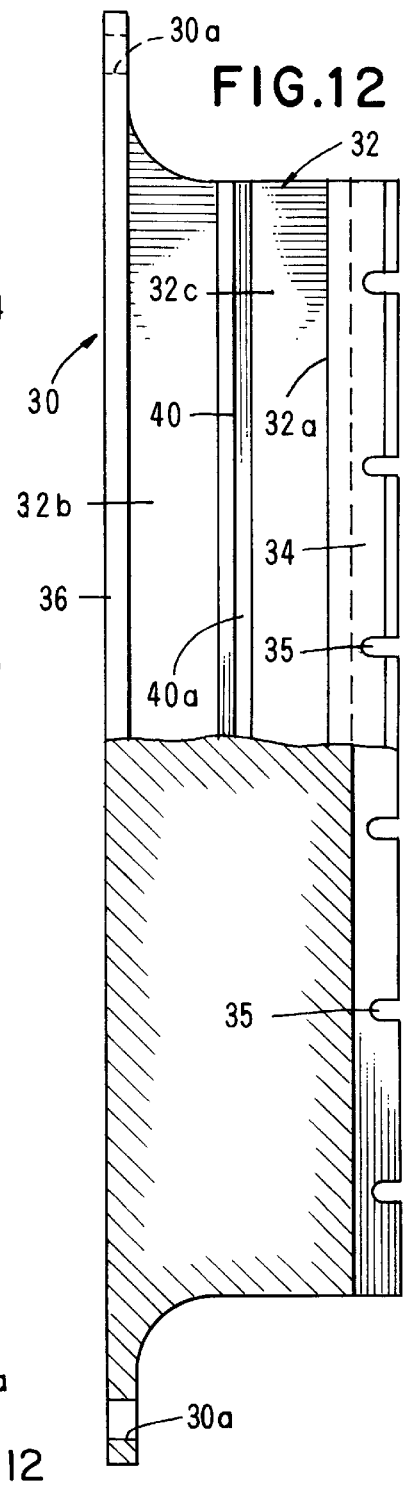
FIG. 12 is a view partially in cross-sectional taken along lines 12—12 of FIG. 11.
Figure 12A:
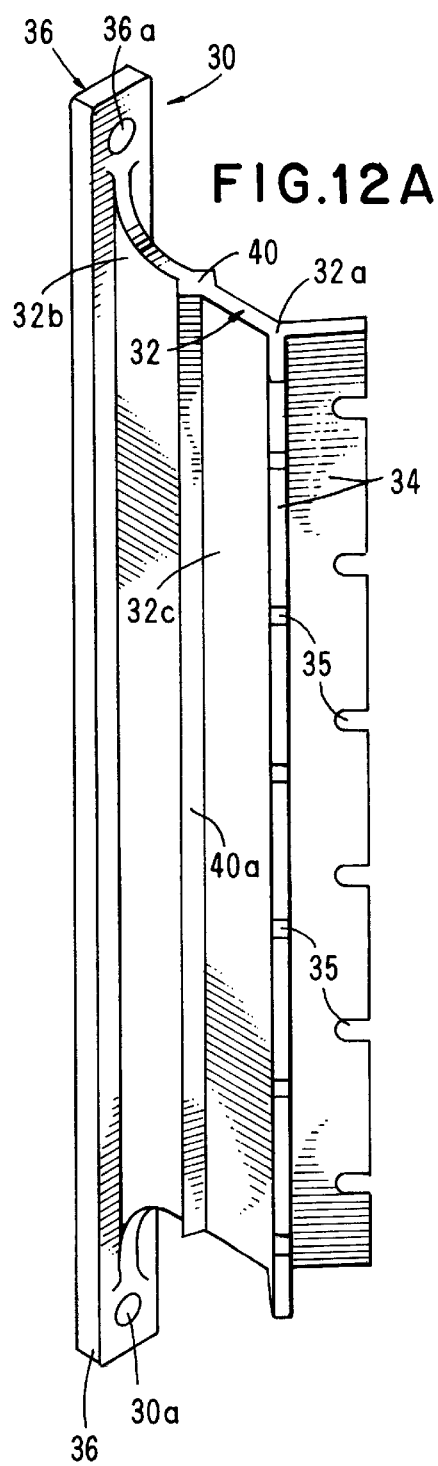
FIG. 12A is a generally perspective view of the connector element shown in FIG. 11.
Figure 15:
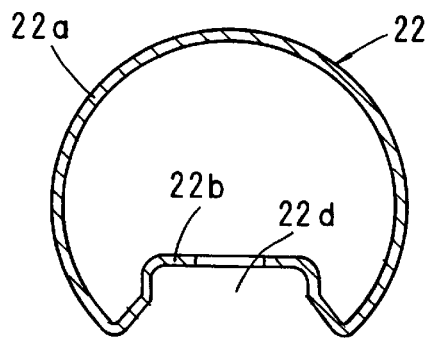
FIG. 15 is an enlarged, cross-sectional view of the central leg portion of the leg assembly shown in FIGS. 13 and 14.

Forming an extremely important aspect of the invention is the previously mentioned connector means for interconnecting legs 22 with various article support structures, such as support structures 24 and 26. In the present form of the invention, the connector means comprises a plurality of uniquely configured first extended connector members 30, each of which has the novel configuration illustrated in FIGS. 6, 7, 11, 12 and 12A. Referring to these figures it is to be observed that each of the connector members 30 comprises an elongated body portion 32 having spaced apart, longitudinally extending first and second edge portions 32a and 32b (FIG. 12A). As best seen in FIG. 6, first edge portion 32a is generally "Y" shaped in cross section, while second edge portion 32b is generally "T" shaped in cross section. More particularly, edge portion 32a comprises a pair of angularly, outwardly extending connector wings 34 the function of which will presently be described. Connected proximate the second, opposite edge 32b of member 32 is an elongated, generally planar connector strip or segment 36, which is interconnected with connector strip 22b of support legs 20. (FIGS. 6, 10 and 15)

Figure 8:
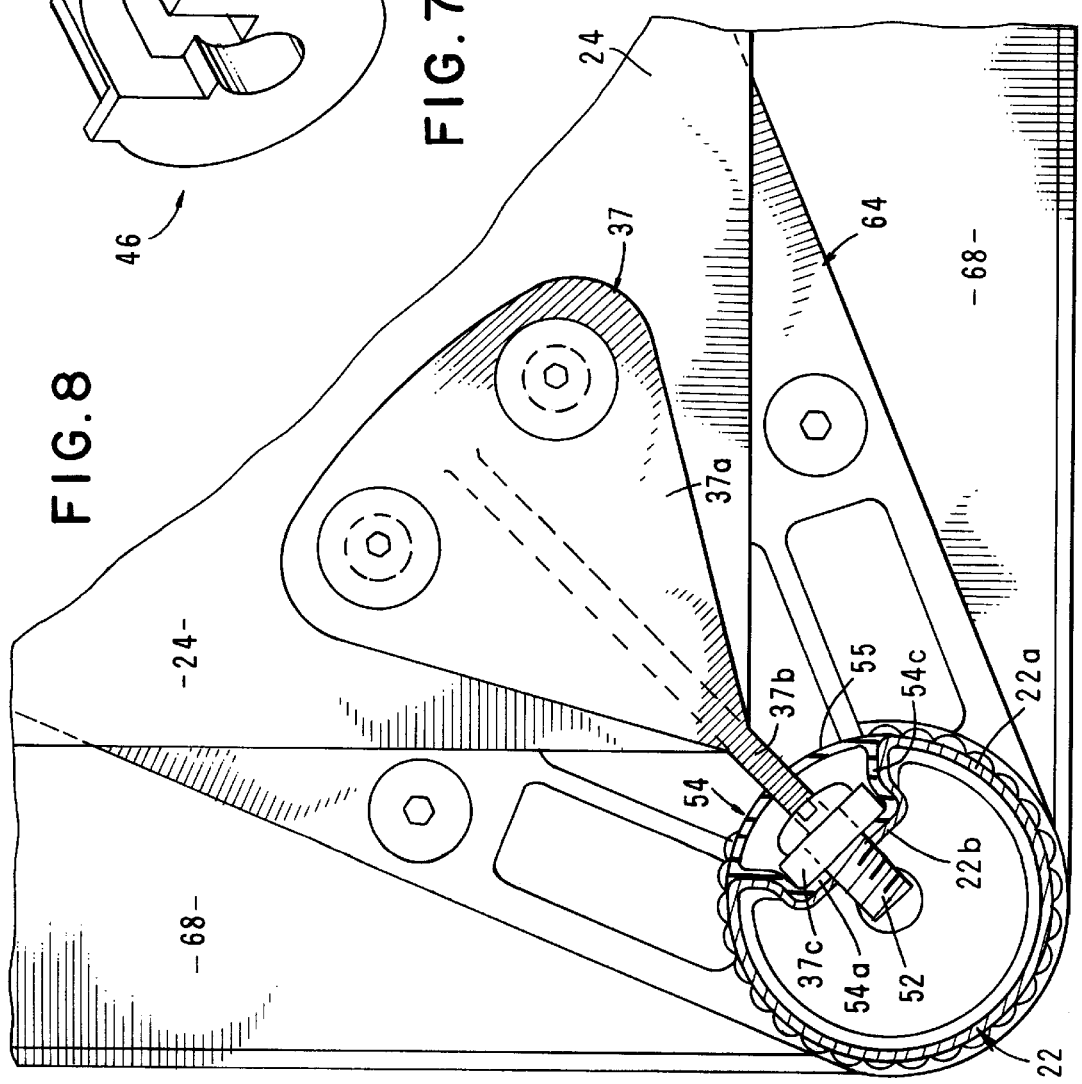
FIG. 8 is a greatly enlarged cross-sectional view taken along lines 8—8 of FIG. 3.
Figure 10:
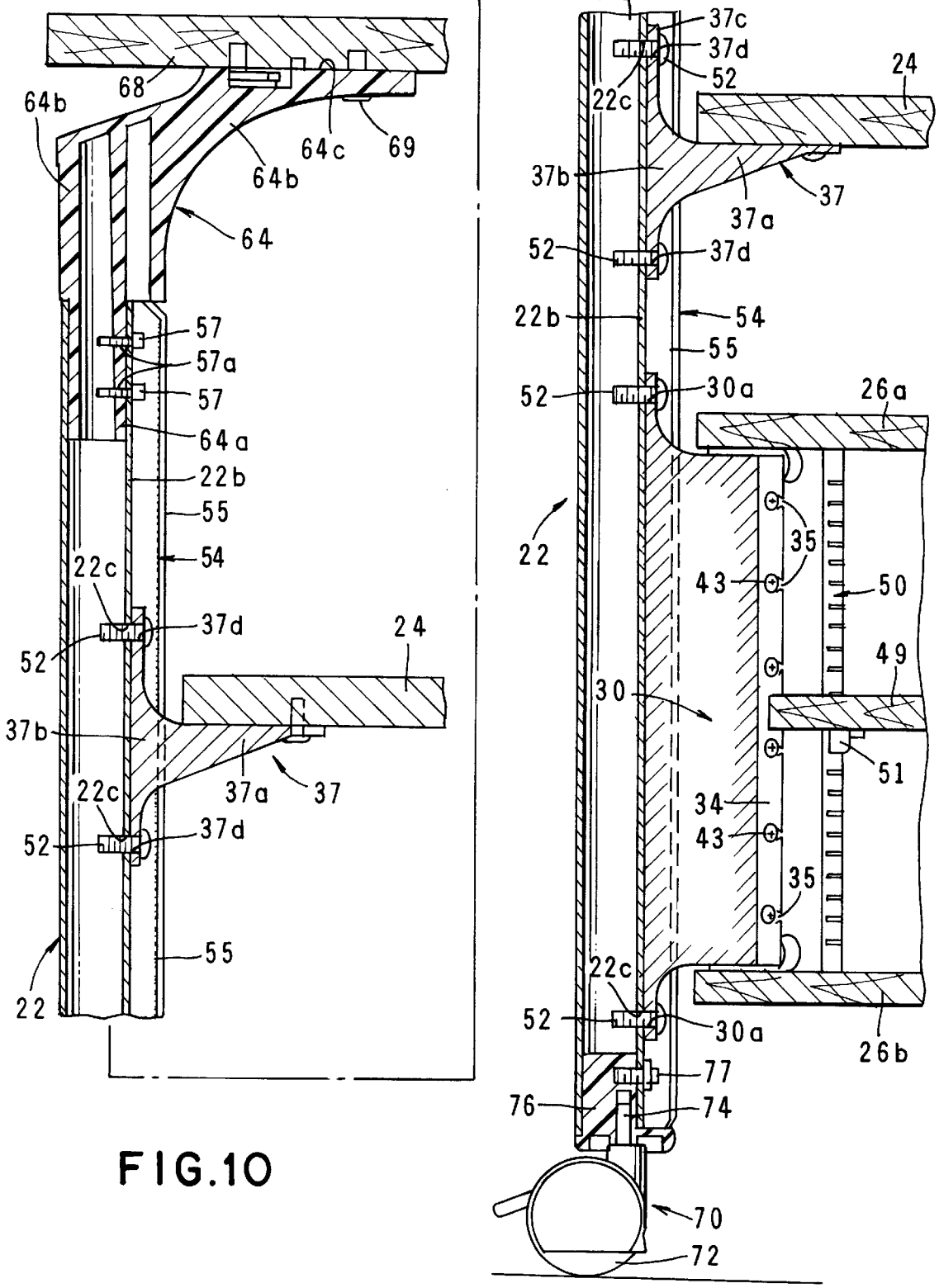
FIG. 10 is a greatly enlarged cross-sectional view taken along lines 10—10 of FIG. 2.
Figure 11:
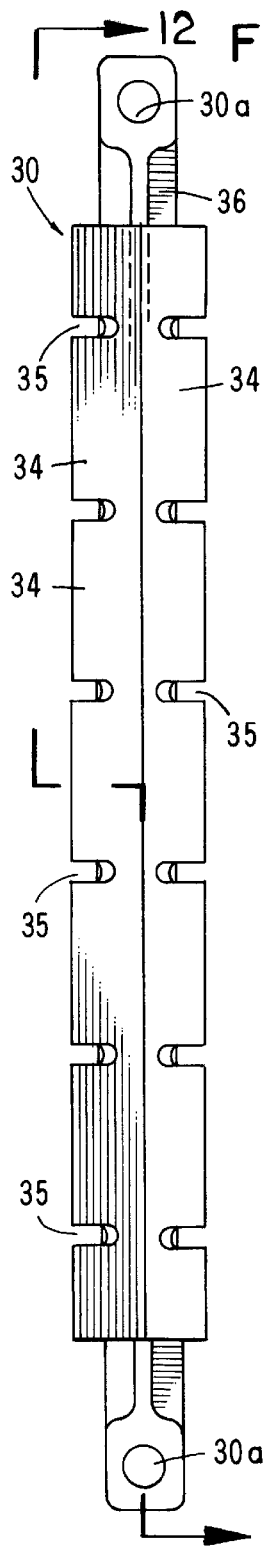
FIG. 11 is a front view of one form of the connector element of the invention for interconnecting the corners of the article support enclosure and also for interconnecting the article support enclosure with the support legs of the apparatus.

As best seen in FIGS. 8 and 10, support structures or shelves 24 are supported by and interconnected with leg assemblies 22 by generally fan shaped connector members 37 (FIG. 14A). As indicated in the drawings, each of the connector members 37 comprises a support body portion 37a, a stem portion 37b and a connector segment 37c. Connector segment portion 37c is adapted to be interconnected with connector surface 22b of each of the legs 22 in the manner best seen in FIGS. 8 and 10.

Figure 5:
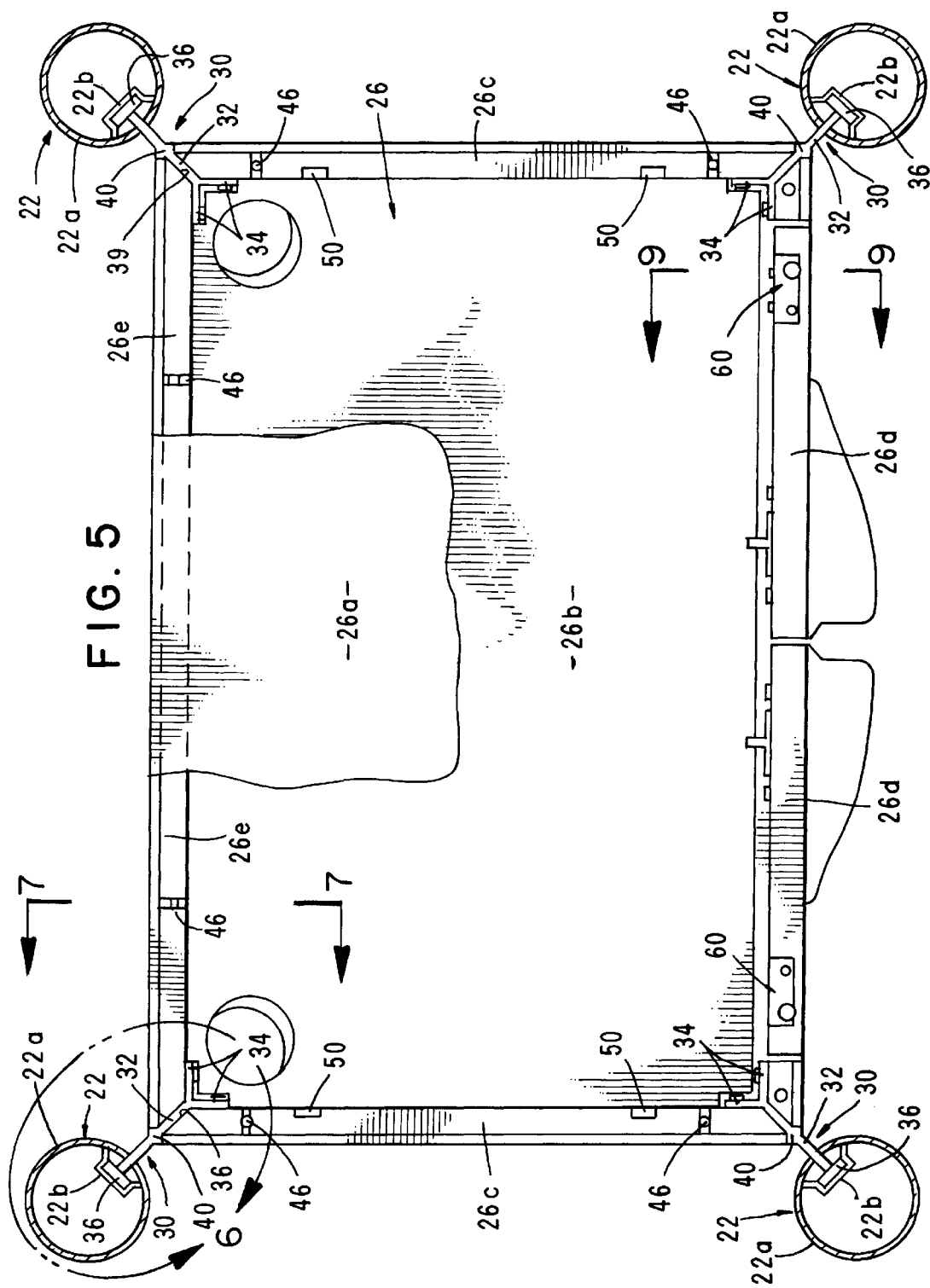
FIG. 5 is a cross-sectional view taken along lines 5—5 of FIG. 3.

Referring particularly to FIGS. 5 and 6, it is to be noted that the first connector means or first connector members 30 function to interconnect first or side panels 26c with second, or back panels 26e. This unique corner connection feature of the connector means is best illustrated in FIG. 6, where it is to be noted that each of the panels 26c and 26e is cut proximate its ends at approximately 45 degrees so as to define angled surfaces 37. These angled surfaces 37 are adapted to abut against portions 32c of the connector member at a location intermediate wings 34 and a locating protuberance 40 formed on connector body 32 intermediate wings 34 and connector strip 36. As indicated in FIG. 6, each locating protuberance 40 is provided with a pair of angularly inclined locating faces 40a which extend outwardly from body 32 portion at an angle of approximately 45 degrees. With this construction, when the angled edges of the side and rear panels 26c and 26e of the first enclosure structure 26 are trimmed in the manner shown in FIG. 6, the trimmed portions 27 will engage faces 40a in a manner to precisely position the panels in engagement with the body of the connector element and the inner faces 34a of the connector wings 34.

Figure 7:
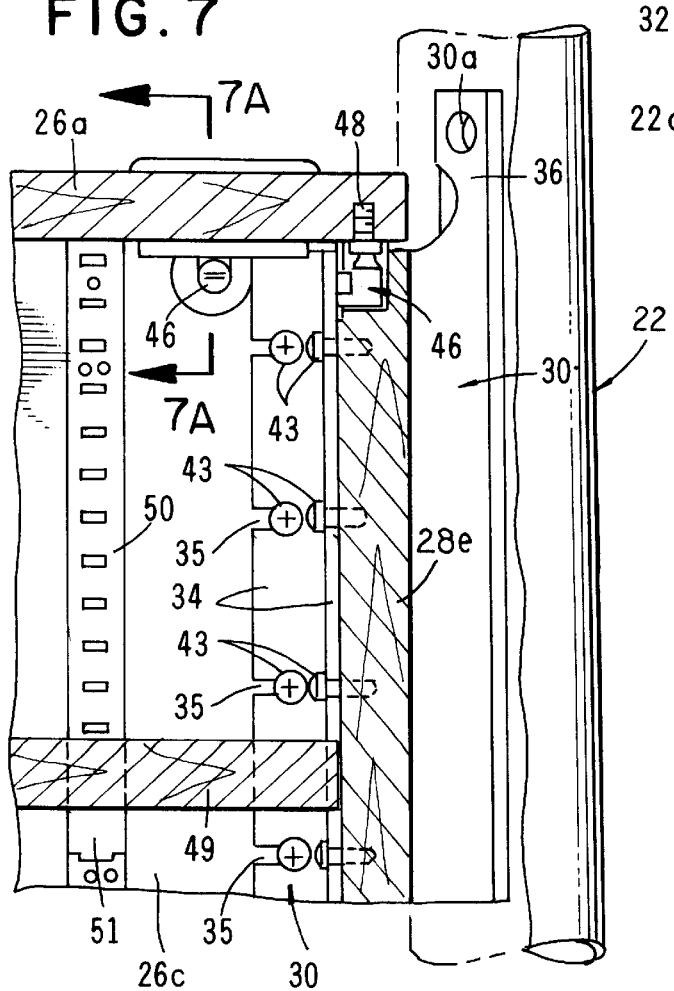
FIG. 7 is cross-sectional view taken along lines 7—7 of FIG. 5.

During the assembly of the first cabinet like enclosure structure 26, panels 26b and 26e are interconnected with connector wings 34 by suitable connectors such as connector screws 43. As indicated in FIG. 7, each of the wings 34 is provided with slots 35 along its length to accept connectors 43 in the manner there shown. When the panels 26c and 26e are interconnected in the manner thus described an extremely rigid article support structure is produced. This assemblage can then be uniquely interconnected with legs 22 in a manner presently to be described.

Figure 7A:
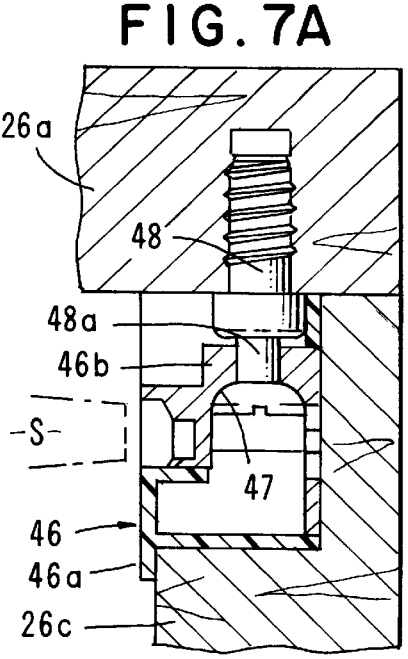
FIG. 7A is an enlarged cross-sectional view taken along lines 7A—7A of FIG. 7.
Figure 7B:
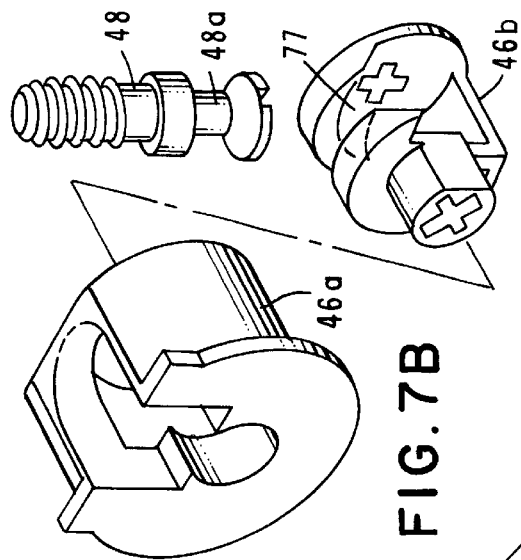
FIG. 7B is an enlarged, generally perspective, exploded view of one of the connector assemblies of the apparatus for interconnecting the side panels of one of the article supports with top and bottom panels thereof

To complete the assembly of first article enclosure 26, top and bottom panels, 26*a* and 26*b* are interconnected with side and back panels 26*c* and 26*e* by means of conventional, commercially available cam lock assemblies of the general character shown in FIGS. 7 and 7A and generally designated by the numeral 46. Assemblies 46, which are readily commercially available from a number of hardware suppliers under the name and style "RAFIX", comprise a hollow body portion 46*a* within which a locking member 46*b* is rotatably mounted. In a manner well understood by those skilled in the art, assembly 46 is mounted within a bore formed in a panel, such as panel 26*c*, (FIG. 7A) at a location proximate an adjacent panel, such as top panel 26*a*. Locking member 46*b* is provided with a circumferentially extending capture groove 47, which upon rotation of the locking member 46*b* relative to body portion 46*a*, by means of a screwdriver "S" will capture a shank portion 48*a* of a threaded screw 48 which is connected to and extends downwardly from panel 26*a* in the manner shown in FIG. 7A. As the locking member is rotated, it will cammingly engage shank portion 48*a* of screw 48 in a manner to urge panel 26*a* into secure engagement with panel 26*c*. Where as shown in FIG. 7, an interior shelf 49 is mounted within first enclosure 26 commercially available slotted hanger strips 50 and hanger clips 51 (FIG 7), are used to support the shelf 49 within the enclosure in a conventional manner well understood by those skilled in the art.

As best seen in FIGS. 10 and 14, the connector surfaces 22*b* of each of the legs 22 are provided with a plurality of spaced apart apertures 22*c* which are configured to accept self-tapping connecting screws 52. When it is desired to interconnect the first and second members 30 and 37, with a given leg 22, apertures 30*a* and 37*d* provided in the respective connector members are aligned with apertures 22*c* provided in the support legs 22 and the connector members are securely affixed to the connector surface of the legs by the connector screws (see FIG. 10). It is apparent from a study of FIGS. 10 and 14, that connector members 30 and 37 can be interconnected with a given leg assembly 22 at various heights so as to conveniently position the various article support structures at the desired height interiorly of the circumscribing legs 22.

Figure 16:
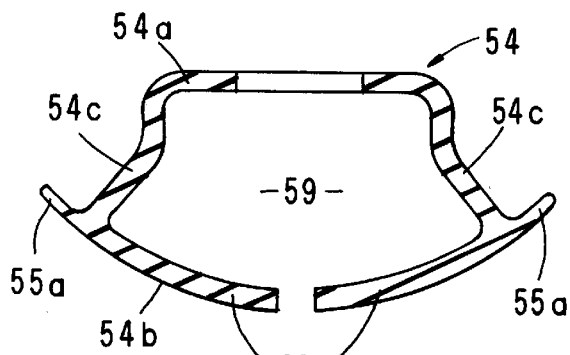
FIG. 16 is a cross-sectional view of the wire chase or leg closure member of the leg assembly shown in FIGS. 13 and 14.

To conceal the connector screws 52 and at the same time provide an enclosed wire chase, a novel closure strip such as a strip identified in FIGS. 14 and 16 by the numeral 54 is used. This uniquely formed closure strip comprises a generally planar rear wall 54*a* which is apertured to receive connector screws 52 and a curved front wall 54*b*, which is interconnected with rear wall 54*a* by side connector elements 54*c*. Curved front wall 54*b* which is formed by a pair of curved segments 55 constructed from a novel, yieldable deformable, elastomeric material such as rubber, neoprene or the like. As indicated in FIG. 14, the interconnection prior to the interconnection members 30 and 37 with a selected leg 22, rear wall 54*a* of closure strip 54 is inserted into the opening 22*d* formed in each of the legs 22 so that the rear wall of the closure strip is moved into engagement with connector strip 22*b*. In this position the resiliently deformable front wall sections 55 function to close opening 22*d* in the manner shown in FIG. 13 with the tip portion 55*a* of sections 55. overlaying curved wall 22*a* of the leg 22. With this construction, when connector elements 30 and 37 are interconnected with legs 20 wall 54*a* of the closure strip 54 is disposed between the connector element and the rear wall or connector strip 22*b* of the leg 22. To interconnect the closure strip with leg 22, connector screws 57 can be inserted through selected openings provided in closure strip 54 (FIG. 10) and into engagement with apertures 57*a* provided in connector surface 22*b* by yieldably deforming sections 55 of closure strip 54. This done, segments 55 can be yieldably spread apart to permit insertion therebetween of support members 30 and 37 in the manner shown in FIG. 10. With the support member thusly inserted between segments 55, the support members can be interconnected with connector wall 22*b* of the leg 20 by means of the threaded connectors 52.

If at any time it is desired to relocate one of the connector elements, such as a connector element 37 in order to raise or lower article support 24, elastomeric segments 55 of the closure member 54 can be spread apart a sufficient distance to permit removal of threaded connectors 52 and appropriate vertical adjustment of connector 37 relative to connector strip 22*b* of legs 22. When the connector elements 30 and 37 are appropriately interconnected with a given leg 22 in the manner just described, yieldably deformable segments 55 of the closure strip cooperate with sides 54*c* thereof to define an elongated wire chase or conduit receiving channel 59, (FIG. 16).

Figure 9:
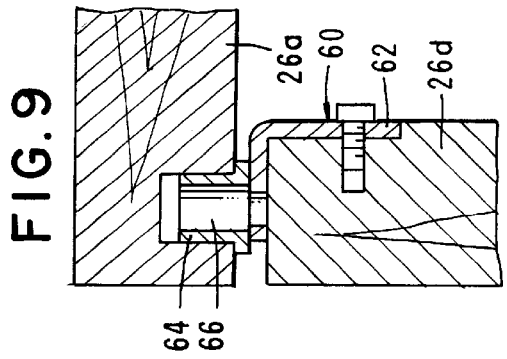
FIG. 9 is a greatly enlarged cross-sectional view taken along lines 9—9 of FIG. 5.

When the assembly of the various article support structures to the legs 22 has been completed, the pivotally mounted doors 26*d* of support enclosure 26 can be interconnected with top and bottom walls 26*a* and 26*c* by means of conventional commercially available pivot assemblies generally designated in FIG. 9 by the numeral 60. These pivot assemblies comprise an angle bracket 62 which is affixed to the doors 22*d* in the manner shown in FIG. 9 and a bearing cup 64 which is closely received within a suitable bore formed in the top and bottom walls 26*a* and 26*b* of support enclosure 26. Bearing cup 64 closely receives a pivot pin 66 which is connected to bracket 62 so that the doors 26*d* can pivot between open and closed positions.

Figure 13:
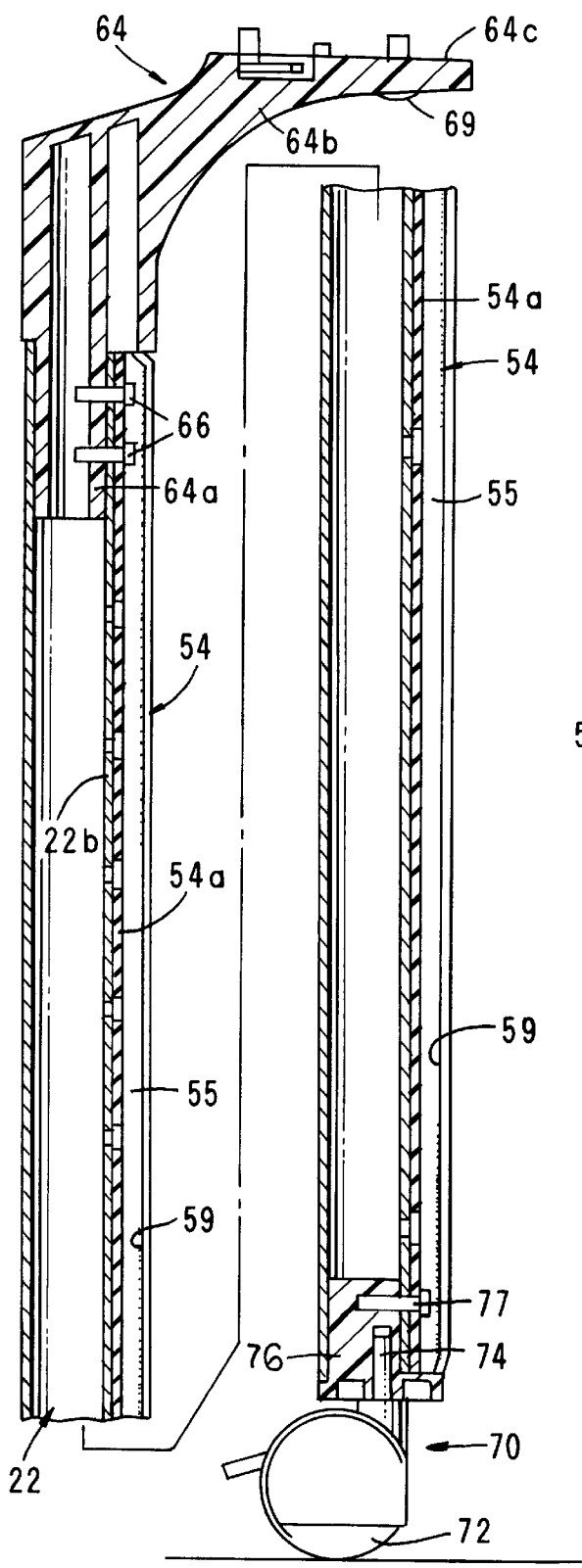
FIG. 13 is a cross-sectional view of one of the leg assemblies of the article of furniture of the present form of the invention.

As shown in FIGS. 13 and 14, a uniquely configured top support member 64 is connected to each leg 22 proximate its upper extremity. Each support member 64 includes a shank portion 64*a* which is closely telescopically receivable within a selected leg 22 in the manner shown in figure 13 and is held in position by suitable connectors 66. Integrally, formed with shank portion 64*a* is a top support portion 64*b* which includes a surface 64*c* that is adapted to support a top panel 68 (FIG. 10). Suitable connectors 69 affix top panel 68 to support members 64 in the manner shown in FIG. 10 so that various articles such as projectors and the like can safely be placed upon panel 68.

Affixed to the bottom of each of the legs 22 are conventional locking roller assemblies 70. Each roller assembly 70 includes a ground engaging roller 72 and a connector stem 74 about which the roller can rotate. As best seen in FIG. 10, stem 74 of each roller assembly is telescopically received within a suitable vertical bore provided in a connector block 76 that is secured within the lower portion of the leg 22 by suitable connectors 77.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made with out departing from the scope and spirit of the invention, as set forth in the following claims.

I claim:

1. In a furniture construction of the character having an article support structure and a corner support for supporting the article support structure, the improvement comprising connector means for interconnecting the article support structure with the corner support, said connector means comprising a first connector member having:
   (a) a first edge portion connected to the article support structure, said first edge portion being generally "Y" shaped in cross section; and
   (b) a second edge portion connected to the corner support, said second edge portion being generally "T" shaped in cross section.

2. The furniture construction as define in claim 1 in which the furniture construction includes another article support structure and in which said connector means comprises a second connector member having:
   (a) a first edge portion connected to said another article support structure, said first edge portion being generally fan shaped; and
   (b) a second edge portion connected to the corner support, said second edge portion being generally "T" shaped in cross section.

3. The furniture construction as defined in claim 1 in which the corner support includes an elongated curved wall section and an elongated connector strip connected to the curved wall section, said "T" shaped edge portion of said first connector member being connected to said elongated connector strip.

4. The furniture construction as defined in claim 1 in which the article support structure comprises an article enclosure having first and second generally perpendicular panels and in which said first edge portion of said connector member comprises first and second generally perpendicular connector wings, the first and second panels of the article enclosure being connected to said connector wings.

5. The furniture construction as defined in claim 4 in which said first connector member further includes an intermediate portion disposed between said first and second edge portions, said intermediate portion having a panel engaging protuberance for engaging the first and second panels.

6. The furniture construction as defined in claim 5 in which said panel engaging protuberance comprises first and second angularly extending faces in engagement with said first and second panels respectively.

7. In a furniture construction of the character having an article support structure and a corner support for supporting the article support structure, the corner support including an elongate curved wall section and an elongate connector strip, the improvement comprising connector means for interconnecting the article support structure with the corner support, said connector means comprising a first connector member having:
   (a) a first edge portion connected to the article support structure, said first edge portion being generally "Y" shaped in cross section; and
   (b) a second edge portion connected to the elongate connector strip of the corner support, said second edge portion being generally "T" shaped in cross section.

8. The furniture construction as defined in claim 7 further including an elongate yieldably deformable cover connected to the corner support and overlaying the elongate connector strip.

9. The furniture construction as defined in claim 8 in which said cover comprises first and second yieldably deformable, curved segments having first and second portions, said first portions overlaying the elongate connector strip and said second portions overlaying a portion of said elongate curved wall section of said corner support.

10. An article of furniture comprising:
    (a) a plurality of spaced-apart legs, each having an outer surface and a connector surface;
    (b) a first article support connected to said legs and to said article support comprising first and second panels; and
    (c) first connector means for interconnecting said legs with said first article support, said connector means comprising a plurality of first connector members each comprising:
        (i) an elongated body having first and second spaced-apart edges;
        (ii) a pair of angularly extending, generally planar connector wings connected to said body proximate said first edge thereof for interconnection with said first and second panels of said first article support; and
        (iii) a generally planar connector segment connected to said body proximate said second edge thereof for interconnection with said connector surface of one of said spaced-apart legs;
    (d) a second article support connected to said legs;
    (e) second connector means comprising a plurality of second connector members for interconnecting said legs with said second article support, each of said second connector members comprising:
        (i) a first edge portion connected to said second article support, said first edge portion being generally fan shaped; and
        (ii) a second edge portion connected to one of said legs, said second edge portion being generally T-shaped in cross section.

11. An article of furniture as defined in claim 10 further including a plurality of elongate yieldably deformable covers connected to said plurality of space-apart legs and overlaying said connector surfaces thereof.

* * * * *